United States Patent [19]

Jalas

[11] Patent Number: 4,978,198

[45] Date of Patent: Dec. 18, 1990

[54] LIGHT FOCUSING MECHANISM

[76] Inventor: Leon C. Jalas, R.R. 1, Sutherland, Iowa 51058

[21] Appl. No.: 429,625

[22] Filed: Oct. 31, 1989

[51] Int. Cl.[5] ........................ G02B 17/00; G02B 27/00

[52] U.S. Cl. .................................... 350/259; 350/263; 350/264

[58] Field of Search ................................ 350/258–265

[56] References Cited

U.S. PATENT DOCUMENTS 4,349,245 9/1982 Kliman ................................ 350/264

*Primary Examiner*—Richard A. Wintercorn

[57] ABSTRACT

A system for providing interior lighting for a building from a natural exterior source including reflectors adapted to reflect the light into a light unit from which the light may be diffused into the building. A sensor keeps the principal reflector aligned with a light source, ordinarily the sun, and side reflectors assure that the sunlight from sunrise to sunset is properly directed into the building. The system is useful, to a lesser extent, for heat as well as light.

12 Claims, 3 Drawing Sheets

LIGHT FOCUSING MECHANISM

BACKGROUND AND SUMMARY OF THE INVENTION

This invention pertains to systems for providing lighting of buildings from natural sources and more particularly to a system which will entrap and reflect sunlight or heat into a building.

Many buildings such as certain livestock and poultry confinement units and even including dwellings such as those using surrounding earth as an insulating means are difficult to light except with artificial lighting. Skylights, although possible, have certain drawbacks such as a tendency, particularly in the winter, to collect frost or condensate and then to drop water in the area below. They are also limited in area so that several may be required. Windows are inefficient insulators and—again in winter—make for cold drafts in the area beneath each window. That is particularly objectionable in livestock or poultry buildings.

By my invention, I provide a system in which sun rays from a fairly large area can be collected and reflected into the building and diffused from there. The structure is such that only a single window is necessary, and the treatment of frost or condensation on the window is one commonly known to almost any builder of the sort of structure involved. A more complete understanding of the invention and its benefits may be had from the following description and the figures in which:

DESCRIPTION

Figure 1:
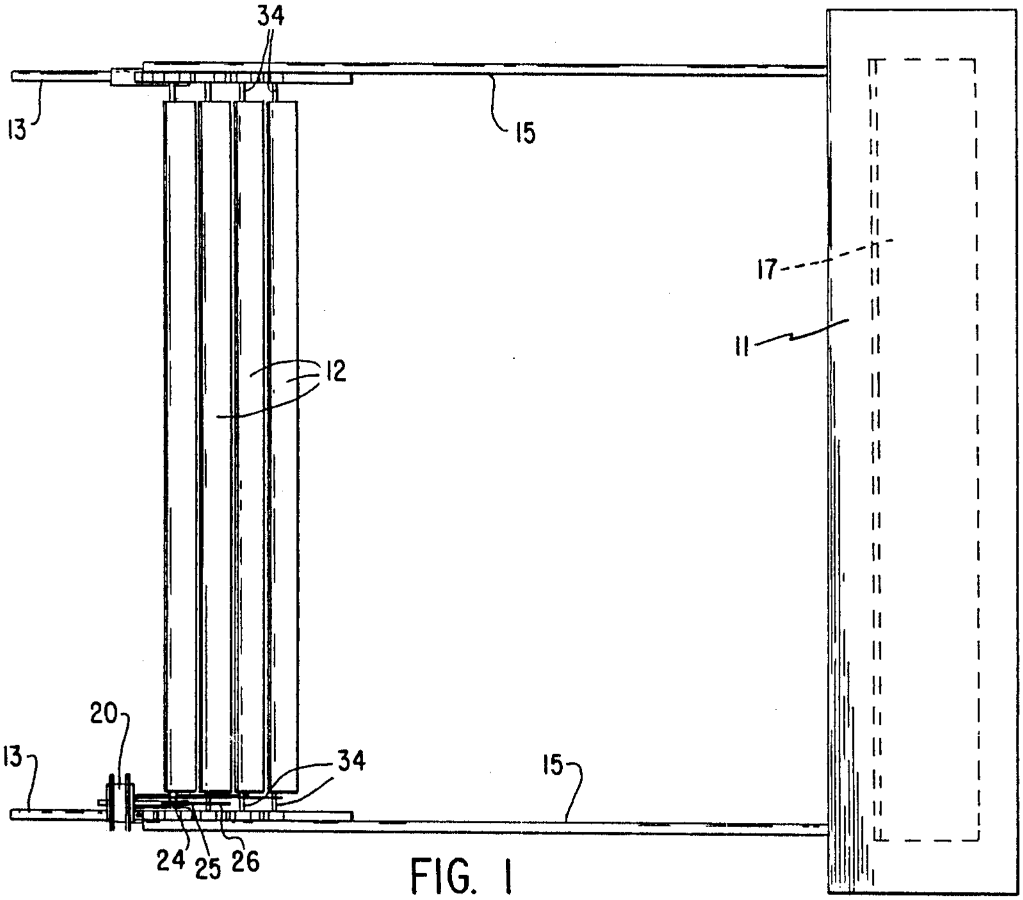
FIG. 1 is a top plan view of the system of my invention in place showing a part of the building.

Briefly my invention comprises a system for reflecting natural rays from the sun into an enclosed building in which the rays are reflected from a series of reflecting mirrors into the building. Side reflectors and a sensor to position the reflecting mirrors assure maximum reflecting efficiency.

More specifically, and referring to the drawings, I illustrate my system mounted on the roofline 10 of a building. A receiving cupola 11 is constructed on the roof and is in position to receive the reflected light. An ordinary glass window, which may be double or triple glazed if desired, is used in the cupola to receive the reflected light.

A bank of reflective surfaces 12 is mounted on a framework 13 on top of the building. For best results in the northern hemisphere, the reflective surfaces should face in a southerly direction. The supporting legs 14 of the framework may be telescopically adjustable as shown in the figures. This adjustment capability may be desirable both for mounting on sloping roofs or to determine the slope at which the bank of reflectors normally stands.

Because the sun, the source of the rays to be reflected into the building, appears to move from east to west, there will be only a limited time when the reflectors 12 will reflect light directly into the cupola. In order to make the device usable during nearly all of the daylight hours, reflective side walls 15 are provided. These walls have mirror-like inner walls. Thus, when the sun's rays are reflected from the reflectors 12, even if that reflection is from one side, it will be reflected from the side walls 15 at least once, and possibly more than once until eventually it enters the cupola 11. Inside the cupola is another reflector 17 adapted to reflect the light into the building to a point where it can be directed as desired.

In order to keep the reflectors 12 in position to reflect the sun's rays horizontally into the cupola, it is necessary that they be moved as the sun rises to its zenith and again as it sets. There are at least two devices which are sensitive to the position of a light source and which will provide differential impulses adapted to be used to control any particular reflector to a neutral position directed at the source of light. Thus, such devices are commonly used to control electrical equipment to orient reflection or other optical devices to follow the source of light, in this case, the sun. The two types include electrical mechanisms, which I prefer to use, and a mechanical device such as that developed by the Zome Works in Albuquerque, N. Mex. In my preferred device, I use an electrical sensor 20 mounted on an arm 21, normally held in a near vertical position in the summer months, and somewhat below that in the winter. In the figures, I illustrate this arm as attached to a lever 22. However, it will be apparent that, except for possible adjustment between the arm 21 and lever 22, the support could be made in a single piece.

Figure 3:
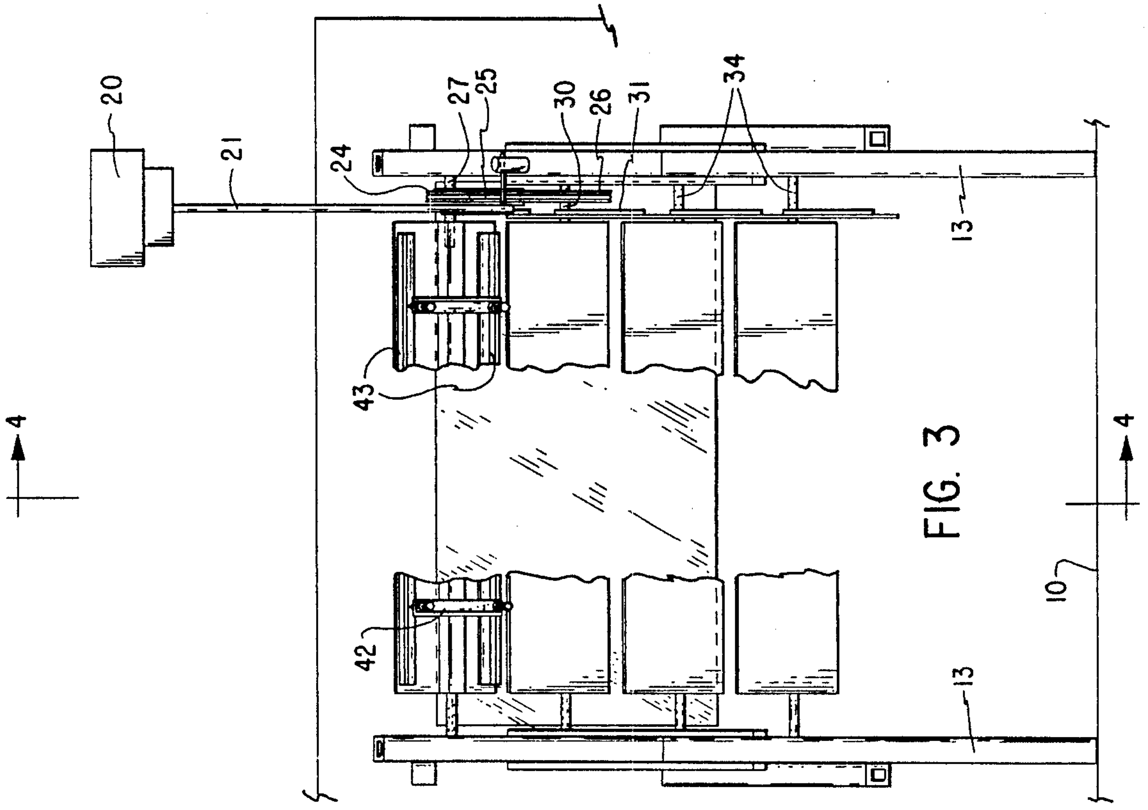
FIG. 3 is a elevational view from line 3—3 of FIG. 2.
Figure 4:
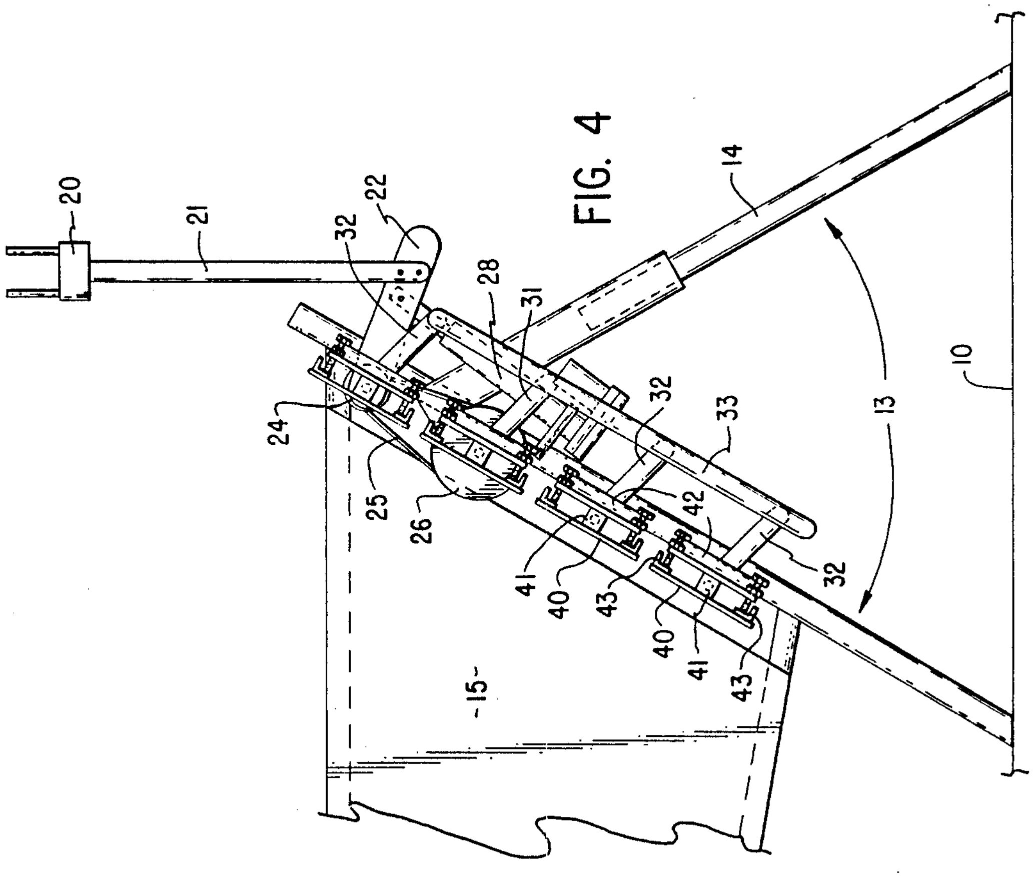
FIG. 4 is a sectional view from line 4—4 of FIG. 3, FIG. 5 view similar to FIG. 4 showing a set of simplified reflector mirrors in a different position from that of FIG. 4.

The lever 22 is fixed to a first pulley 24 and connected by a belt 25 to a second pulley 26 twice the size of the first. The first pulley 24 is freely journalled on an axle 27 (FIG. 3) so that it can be moved by the lever 22 and arm 21. A linear actuator 28 is physically connected between the frame 13 and the lever 22' and is electrically connected to and controlled by the sensor 20 and thus serves to position the lever at the spot where the sun (or other light source) is in direct line with the sensor. This operation is identical with either the electrical or the mechanical sensor.

Movement of the first pulley 24 in response to controlled movement of the actuator 28 is transmitted to the second pulley 26 through the belt 25. Because of the ratio of the diameters (1:2) the second pulley 26 moves through precisely one-half the arcuate distance of the first pulley 24. Thus, direct connection of the second pulley 26 to the reflectors 12 will cause these devices to move through half the angle traversed by the sun. Because they are reflectors, the beam of reflected light will then continue in the same plane as the reflectors 12 are moved in response to the sun's movement.

The connection between the reflectors 12 and the second pulley 26 is accomplished by direct connection of that second pulley to the shaft 30 (FIG. 3) on which the pulley 26 is fixed. Also connected to the shaft is a lever 31. This lever is linked with similar levers 32 in a quadrilateral linkage by a link 33. The linkage formed by the levers 32 and the link 33 may be a parallelogram linkage. However, I prefer to use a slight deviation from a true parallelogram in order to provide a focusing feature. By changing the linkage just slightly, I can focus the different reflectors 12 so as to provide a concentration of rays directed to the reflector 17. By means of the linkage, all of the shafts 34 by which the reflectors 12 are journalled on the frame 13 will be moved in unison.

Figure 2:
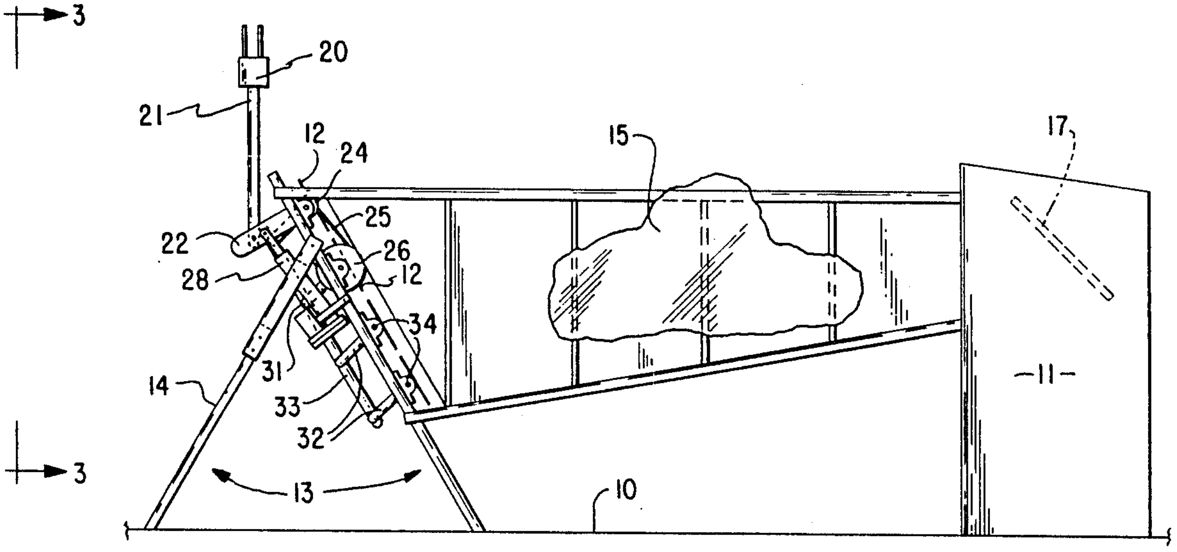
FIG. 2 is a side elevational view of the system of FIG. 1.
Figure 5:
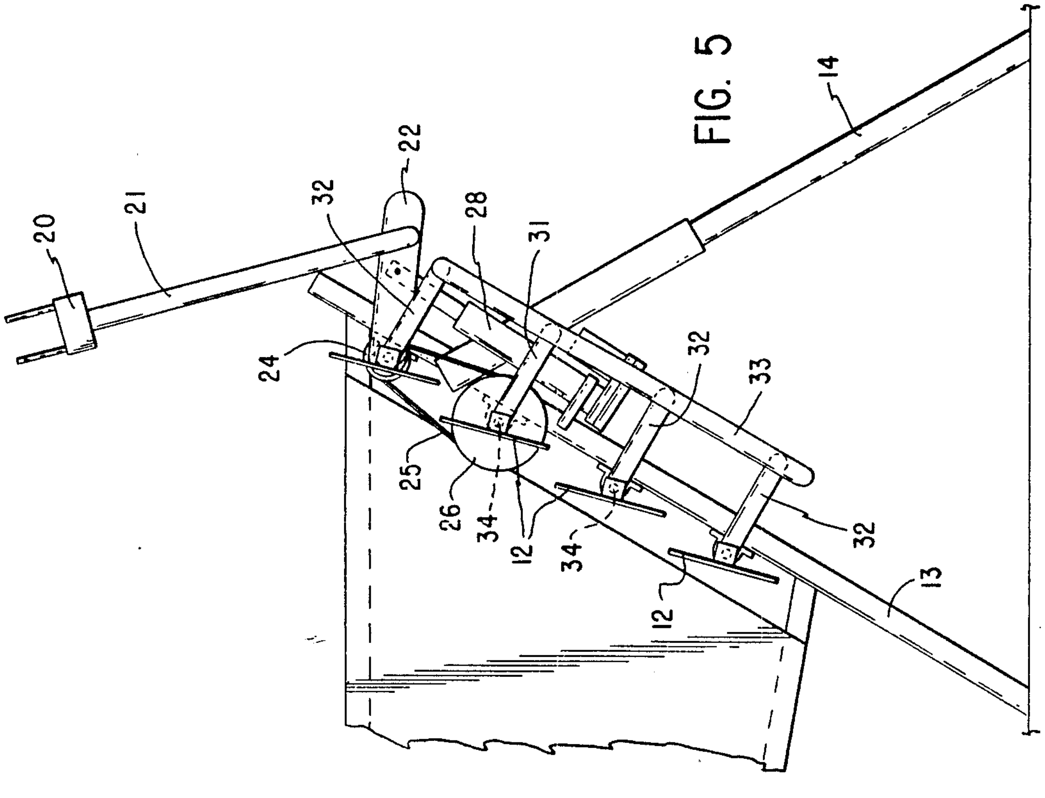

Although the device works well with the flat reflectors illustrated in FIGS. 1, 2 and 5, a slightly more complex reflector shown in FIGS. 3, 4, 6 and 7 will provide a somewhat more controllable reflected beam of light. This alternative form of reflector allows for a modest amount of lateral curvature by which the rays can be concentrated somewhat.

Figure 7:
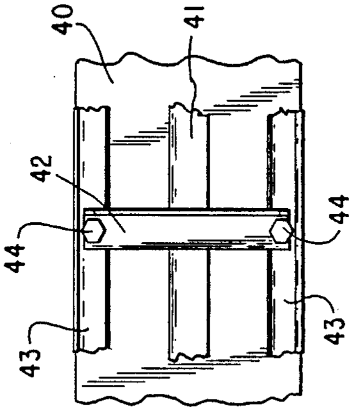
FIG. 7 is a partial view from line 7—7 of FIG. 6.
Figure 6:
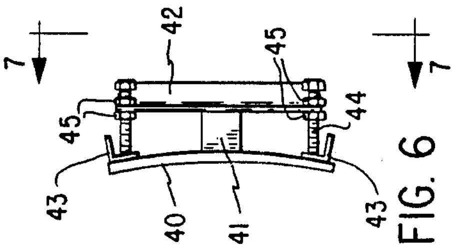
FIG. 6 is an end view of one of the preferred reflectors.

As best shown in FIGS. 6 and 7, the reflector is formed of a resilient plastic or metal strip 40 connected or otherwise fixed to a central bar 41. These bars terminate in the shaft ends 34 similar to those shown in the other figures. My preferred material for the strip is an acrylic material because of its ability to resist weather. However, chromimum plated material or stainless steel might also be used. Cross members 42 are also cemented or otherwise fixed to the bar 41. These cross members are relatively stiff members and may take the form of angle-irons as shown. Longitudinal stiffness for the reflector is provided by cementing longitudinal stringers 43 to the reflector strip 40 near its edges.

Curvature of the reflector strip 40 is induced by pressing the edges of the strip away from the center. The means to accomplish that end includes a series of screws 44 adapted to press against the stringers 43. The screws are threaded into nuts 44 which may be fastened to the cross members 42 or may be clamped to those members by nuts 45. If the clamping system is used, the opening in the cross members 42 through which the bolt passes may be slotted so that the position of the bolt may be adjusted to correspond to the lateral position of the stringer 43. Thus, the screw 44 will not press on the strip 40, but is always directed at the stringer 43.

It will be clear that adjustment of the curvature can be used to focus the reflected rays somewhat. Thus, a smaller cupola might be possible with such a system. It also is clear that the adjustment, once made, will not require frequent change. Thus, the nuts 45 can be jammed tightly to hold the curvature and will not normally need to be moved for any single installation.

I claim as my invention:

1. A system for reflecting rays from an exterior source into a structure comprising means on said structure for receiving said rays, principal reflecting means including at least one adjustable reflector, and side auxiliary reflecting means extending from said principal reflecting means to said means of receiving rays, said auxiliary reflecting means being adapted to reflect any light rays extending to the side so that all rays are retained between said side auxiliary means to be reflected into said structure for receiving the rays.

2. The system of claim 1 in which principal reflecting means is adjusted by control means sensitive to the height of the source of said rays.

3. The system of claim 1 in which said principal reflecting means includes a frame, said adjustable reflector being adjustably mounted on said frame, light sensor means movably mounted on said frame, motion causing means on said frame connected to said sensor means whereby said sensor means controls said motion causing means to hold said sensor means aligned with said source of said rays, and means connecting said sensor means to·said adjustable reflector to keep said adjustable reflector in proper alignment with said light source to reflect rays into said means for receiving said rays.

4. The system of claim 3 in which said means connecting said sensor to said adjustable reflector is adapted to move said reflector by one-half the arcuate distance traveled by said sensor.

5. The system of claim 1 in which said principal reflecting means includes a plurality of adjustable reflectors, each tiltably mounted for tilting through a vertical arc.

6. The system of claim 3 in which said principal reflecting means includes a plurality of adjustable reflectors tiltably mounted on said frame, said plurality of reflectors being joined by a quadrilateral linkage whereby said adjustable reflectors are kept in substantially the same relation to each other.

7. The system of claim 6 in which said means connecting said sensor to said adjustable reflectors includes a first pulley rotatably mounted on said frame and fixed relative to said sensor means, second pulley means rotatably mounted on said frame and connected to said quadrilateral linkage.

8. The system of claim 7 in which the diameter of said second pulley is twice that of said first pulley whereby the arcuate distance traveled by said second pulley will equal one-half that travelled by the first pulley.

9. The system of claim 5 in which said adjustable reflectors are curved to focus said reflected rays into said means on said structure for receiving rays.

10. The system of claim 9 in which said adjustable reflectors include a resilient reflecting surface strip, and means attached to said surface strip to adjust the curvature of said strip.

11. The system of claim 10 in which said means to adjust the curvature includes a bar attached to the hack of said strip, cross members attached to said bar and screw means threadably engaged with said cross members and adapted to press against the edges of said strip whereby threadable adjustment of said screw means changes the curvature of said strip.

12. The system of claim 11 in which stiffening stringers are fixed to said strip, and said screw means engage said stringers.

* * * * *